J. F. OVERCASH.
HAMMER.
APPLICATION FILED JULY 31, 1913.

1,103,918.

Patented July 14, 1914.
2 SHEETS—SHEET 1.

WITNESSES
E. W. Callaghan
A. E. Trainor

INVENTOR
JOHN F. OVERCASH,
BY Munn & Co.
ATTORNEYS

J. F. OVERCASH.
HAMMER.
APPLICATION FILED JULY 31, 1913.
1,103,918.
Patented July 14, 1914.
2 SHEETS—SHEET 2.
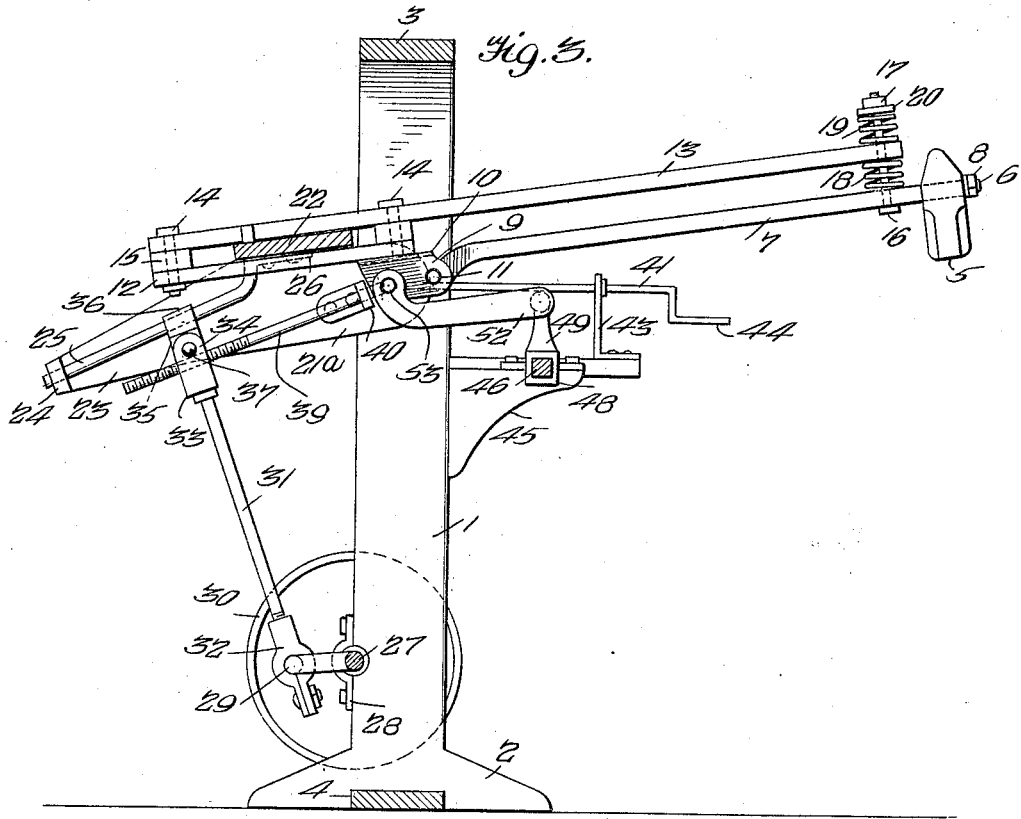
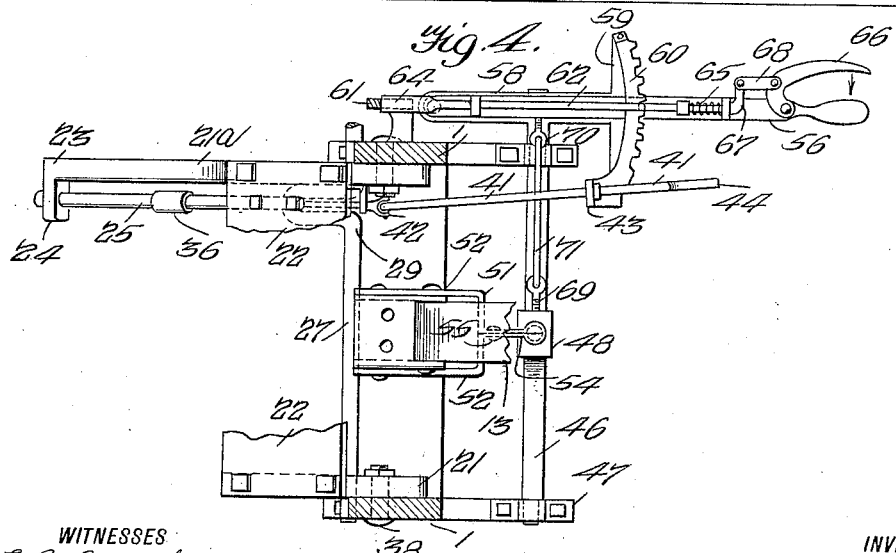
WITNESSES
E. M. Callaghan
C. E. Trainer
INVENTOR
JOHN F. OVERCASH,
BY Munn & Co.
ATTORNEYS

UNITED STATES PATENT OFFICE.

JOHN F. OVERCASH, OF PRIMGHAR, IOWA.

HAMMER.

1,103,918.　　　　Specification of Letters Patent.　　Patented July 14, 1914.

Application filed July 31, 1913. Serial No. 782,254.

*To all whom it may concern:*

Be it known that I, JOHN F. OVERCASH, a citizen of the United States, and a resident of Primghar, in the county of O'Brien and State of Iowa, have invented an Improvement in Power-Hammers, of which the following is a specification.

My invention is an improvement in power hammers, and has for its object to provide a hammer of the character specified capable of use with the ordinary blacksmith's anvil, wherein mechanism is provided for controlling the power of the blow, and for controlling the movement of the hammer, so that the blow may be delivered upon any part of the work.

Figure 1:
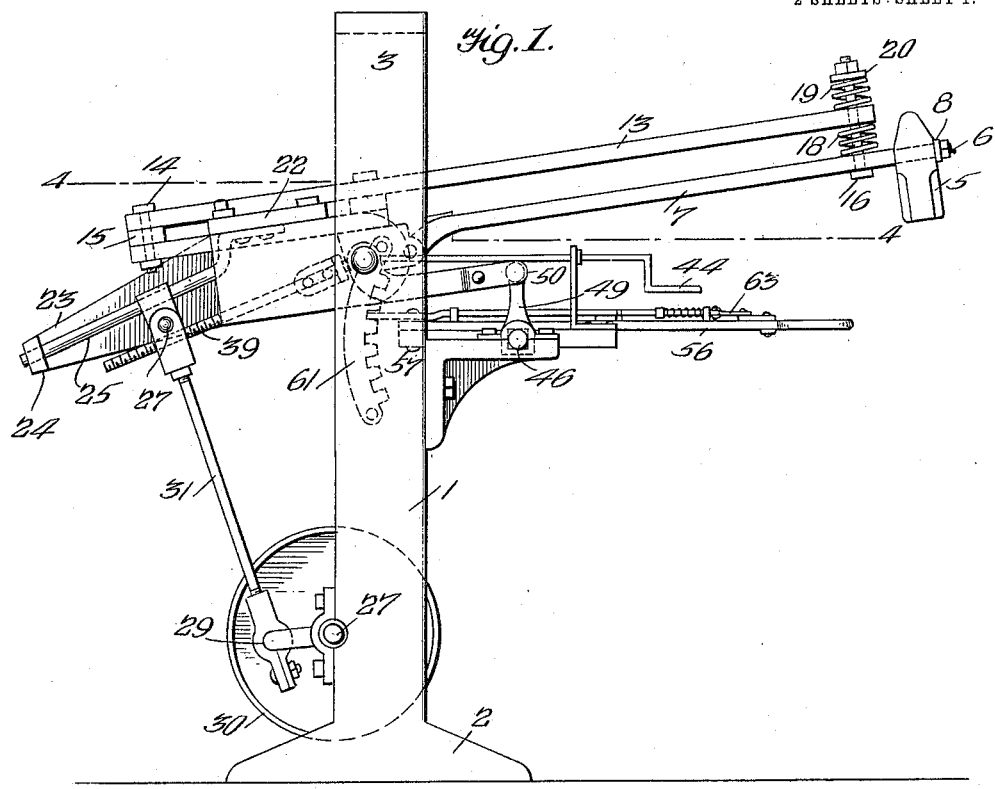
Figure 2:
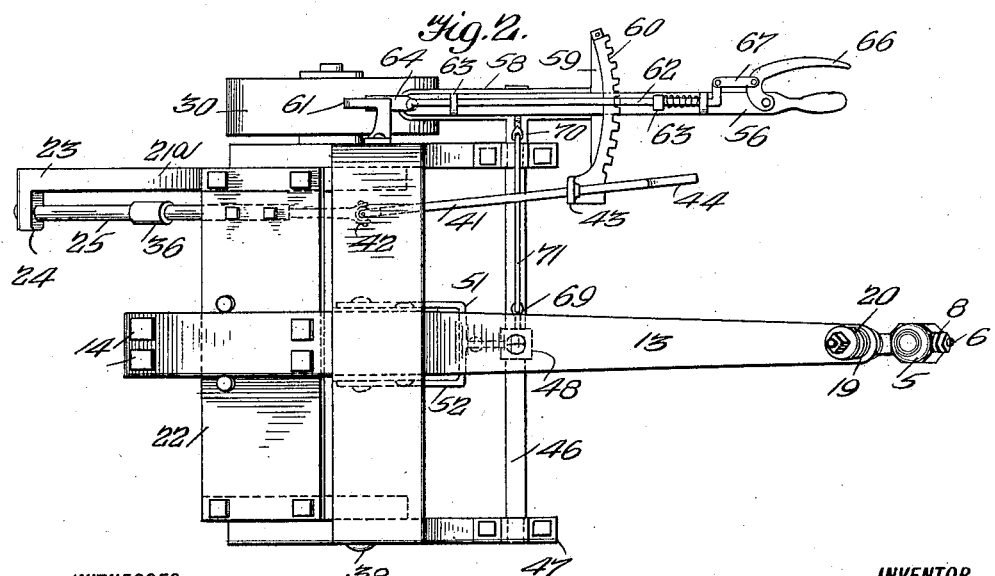

In the drawings, Figure 1 is a side view of the improved hammer, Fig. 2 is a top plan view, Fig. 3 is a transverse vertical section, and Fig. 4 is a section on the line 4—4 of Fig. 1.

The present embodiment of the invention comprises a supporting frame consisting of standards 1, each having a foot 2 at its lower end, and the standards are connected by upper and lower cross bars 3 and 4 respectively.

The hammer 5 is arranged on the reduced outer end 6 of a handle 7, and is held on the said end by means of a nut 8. The inner end of the handle is curved downwardly, as shown, and is pivoted between the arms 9 of a substantially U-shaped bracket comprising a body 10 and the arms 9, by means of a bolt 11, the bolt passing through the arms and the curved end of the handle. The body 10 of the bracket is secured to a plate 12, which is secured to a bar 13 in spaced relation by means of bolts 14, and spacing blocks 15 are arranged between the plate and the bar at each end of the plate. The bar 13 is arranged between the uprights 1, and the said bar extends beyond the frame at both ends of the bar. That end of the bar 13 adjacent to the hammer 5 extends near to the hammer, and a bolt 16 is passed through the handle 7 and the bar and is engaged by a nut 17 above the bar.

Coil springs 18 and 19 encircle the bolt on opposite sides of the bar, one of said springs being between the handle and the bar and the other being between the bar and a washer 20 adjacent to the nut 17. The outer end of the handle 7 is thus yieldingly connected to the supporting bar or beam 13.

Arms 21 and 21$^a$ are pivoted to the respective standards, and extend on the opposite side of the frame from the hammer 5, and the said arms are connected near the standards and on their upper edges by means of a plate 22, and said plate passes between the plate 12 and the beam 13, between the bolts 14 which connect the plate 12 to the beam. The hammer, the handle, and the beam are thus supported by the arms 21 and 21$^a$, and when the said arms are swung, it will be obvious that the hammer will also be swung. The arm 21$^a$ is extended beyond the arm 21, as indicated at 23, and the extension is provided with an angular inwardly extending lug 24.

A slide rod 25 is supported at one end by the lug 24 and at the other end, the rod is curved upwardly and provided with an extension 26 which is bolted to the plate 22 near the arm 21$^a$.

A shaft 27 is journaled in sectional bearings 28 on the standards 1 near their lower ends, and the said shaft is provided with a crank arm 29 near one of the standards and near one end of the same and with a pulley 30 outside of the said standard.

A pitman 31 connects the crank arm 29 with the slide rod 25, one end of the pitman being threaded into a split bearing 32 which is engaged with the crank arm and the other end is engaged with a socket 33 having oppositely arranged ears or lugs 34 which engage opposite sides of a lug 35 on a sleeve 36 mounted to slide on the rod 25. The lugs 34 and 35 are pivoted together by means of a bolt 37 and it will be evident that when the shaft 27 is rotated, the arms 21 and 21$^a$ will be vibrated or swung on their pivotal connection with the standards, whereby to vibrate the hammer.

The arms 21 and 21$^a$ are pivoted to the standards by means of bolts 38, and the length of the stroke of the hammer is regulated by means of a threaded rod 39 which is threaded through an opening in the lug 35 of the sleeve 36. The rod is journaled at its upper end in a bearing bracket 40 secured to the arm 21$^a$, and a shaft 41 is connected to the said upper end of the rod by means of a universal joint 42. The shaft is journaled in a bearing bracket 43, mounted in a manner to be presently described, and is provided with a handle 44 at the end adjacent to the hammer. It will be evident that when the shaft 41 is rotated by means of the crank arm 44, the rod 39 will also be rotated, and since the said rod has a threaded engagement with the sleeve 36, the said sleeve will be moved longitudinally of the slide rod, to vary the length of the stroke of the hammer.

Brackets 45 are secured to the respective standards at the opposite edge from the shaft 27, and a slide bar 46 of square cross section is supported by the brackets. The slide bar is connected to the brackets by means of sectional bearings 47, and a sleeve 48 is mounted to slide on the bar. The sleeve is provided with an upwardly extending arm 49 provided at its free end with a ball, and the ball is engaged by a split socket 50 on a lug 51 connected with a substantially U-shaped bracket to be described. The said bracket is composed of a sectional body 51 and arms 52, and each of the arms is curved upwardly at its rear end, as shown in Fig. 3, and is pivoted to the adjacent arm 9 of the U-shaped bracket 9-10 by means of a bolt 53. Each of the sections of the body 51 of the bracket 51-52 is provided with an arm 54 extending toward the arm 49 of the sleeve 48, and the free end of each of the said arms 54 has one of the sections of the sockets integral therewith, and the sockets are held in engagement with the ball of the arm 49 by means of a rivet 55 passing through the arms 54. The sleeve 48 is thus connected with the handle 7, the beam 13, and the plate 26, and it will be evident that when the said sleeve 48 is moved longitudinally of the slide bar 46, the hammer 5 will be swung from side to side.

A common mechanism is provided for moving the hammer laterally and for moving the hammer and its supporting mechanism longitudinally, and for holding the hammer and its supporting mechanism in adjusted position. The said mechanism comprises a lever 56 which is pivoted at its inner end by means of the bolt 57 to the body of a T-shaped support, the said support comprising the body or stem 58 and a cross bar 59. The body 58 of the T-shaped support rests upon the extended end of the slide bar 46, the said bar being extended beyond one of the supporting brackets 45.

A toothed sector 60 is secured on the cross bar 59 of the T-shaped support and the bearing bracket 43 of the shaft 41 extends upwardly from the inner end of the said sector. A similar sector 61 is secured to the outer face of the standard 1 adjacent to the T-shaped support, and the lever 56 is provided with latch mechanism for coöperating with both sectors.

A rod 62 is mounted to slide in bearing lugs 63 on the lever 56, and the said rod is provided at its inner end with a latch member 64 coöperating with the sector 61. Near its outer end, the lever is provided with a similar latch member coöperating with the sector 60.

A coil spring 65 normally presses the rod 62 into engagement with the sectors, and a latch lever 66 is pivoted to the lever 56 and is connected to the angular end 67 of the rod by means of the link 68. The lever 56 is provided with a grip at its outer end, as shown in Figs. 2 and 4, and when the latch lever 66 is pressed toward the grip, both latch members will be released from the respective sectors, to permit the lever 56 to swing freely from side to side, or vertically.

Screws 69 and 70 are connected with the sleeve 48 and the lever 56 respectively, each screw having an eye, and the screws are connected by a link 71 which engages the eyes at its ends. When the lever 56 is moved laterally on its pivotal connection with the T-shaped support, the sleeve 48 will be moved longitudinally of the slide bar 46, and through the connection of the bracket 51—52 with the hammer support, the said support will also be moved laterally on the plate 22. The slide bar 46 is mounted to rotate in the sectional bearings 47, and when the lever 56 is swung vertically, the said slide bar will be oscillated to move the hammer support longitudinally, and laterally with respect to the plate 22. It will be noted from an inspection of Fig. 3, that the spacing blocks 15 are spaced apart sufficiently to permit longitudinal movement of the hammer support.

In operation, the shaft 27 is rotated in any suitable manner, and the hammer 5 coöperates with an ordinary blacksmith's anvil. The operator stands at the lever 56 and by means of the lever and the shaft 41, he may control the stroke of the hammer. By means of the said lever 56, the hammer may be swung laterally with respect to the supporting frame, or may be moved toward and from the said supporting frame. If the anvil, for instance, is arranged with its long axis parallel with the cross bars 3 and 4, the hammer may be swung from end to end of the anvil or from side to side of the anvil, by means of the lever 56.

The stroke of the hammer is adjusted by means of the shaft 41. It will be evident that when the pitman is moved toward the lug 24, the length of the stroke of the hammer will be lessened, while when the said pitman is moved toward the supporting frame, the length of the stroke will be increased. Thus the stroke of the hammer may be varied within nice limits, in accordance with the force of the blow that it is desired to deliver with the hammer. The hammer is also yieldingly connected with its support, so that it does not strike a rigid blow, but on the other hand a yielding blow, thus avoiding any danger of breakage. The tension of the springs 18 and 19 may be adjusted by turning the nut 17 in the proper direction.

I claim:—

1. A power hammer comprising a supporting frame, a swinging frame arranged transversely of the supporting frame near the top thereof, and mounted to swing on an axis transverse to the supporting frame, a beam mounted to swing with the swinging frame and movable laterally of the swinging frame and movable longitudinally on the swinging frame, means for swinging the frame, and a common means for moving the beam longitudinally and laterally of the swinging frame.

2. A power hammer comprising a supporting frame, a swinging frame arranged transversely of the supporting frame near the top thereof, and mounted to swing on an axis transverse to the supporting frame, a beam extending laterally from the frame on both sides thereof and having a slidable connection with the swinging frame for permitting the beam to be moved longitudinally and to be moved laterally with respect to the swinging frame, and from side to side of the supporting frame, a common means for moving the beam longitudinally and for moving the beam laterally, said means comprising a slide bar arranged approximately parallel with the axis upon which the frame swings, a sleeve slidable on the slide bar, a bracket pivoted at one end to the sleeve and at the other to the swinging frame, said slide bar being mounted to oscillate, and a common means for oscillating the bar and for moving the sleeve longitudinally thereof.

3. A power hammer comprising a supporting frame, a swinging frame pivoted to the supporting frame to swing on an axis transverse to the said supporting frame, a beam supported by the swinging frame and movable therewith, a hammer handle pivoted to the beam adjacent to the supporting frame, a bolt passing through the handle and the end of the beam remote from the swinging frame, springs arranged on the bolt on opposite sides of the beam, and a nut threaded on to the bolt for varying the tension of the springs.

4. A power hammer comprising a supporting frame, a swinging frame arranged transversely thereof and mounted to swing on an axis transverse to the supporting frame, a beam mounted to swing with the swinging frame, a slide rod connected with the swinging frame and extending perpendicularly to the axis upon which the frame swings, a power shaft journaled parallel with the axis of the swinging frame and provided with a crank, a pitman journaled at one end of the crank and slidable at the other end on the rod, said pitman having a threaded opening and a threaded rod engaging the opening, said rod being journaled on the swinging frame, and means for rotating the rod.

JOHN F. OVERCASH.

Witnesses:
W. H. Brown,
W. H. Downing.

---

Copies of this patent may be obtained for five cents each, by addressing the "Commissioner of Patents, Washington, D. C."